United States Patent [19]

Task et al.

[11] Patent Number: 5,679,949
[45] Date of Patent: Oct. 21, 1997

[54] NIGHT VISION DEVICE AUTOMATED SPECTRAL RESPONSE DETERMINATION

[75] Inventors: Harry L. Task, Dayton; Alan R. Pinkus, Fairborn, both of Ohio

[73] Assignee: The United States of America as represented by the Secretary of the Air Force, Washington, D.C.

[21] Appl. No.: 491,390

[22] Filed: Jun. 16, 1995

[51] Int. Cl.$^6$ ..................................................... G01J 5/52
[52] U.S. Cl. ............................. 250/252.1; 250/504 R
[58] Field of Search .......................... 250/504 R, 252.1 A

[56] References Cited

U.S. PATENT DOCUMENTS

| | | | |
|---|---|---|---|
| 5,070,239 | 12/1991 | Pinkus | 250/252.1 A |
| 5,200,622 | 4/1993 | Rouchon et al. | 250/334 |
| 5,204,532 | 4/1993 | Rosenthal | 250/341 |
| 5,206,511 | 4/1993 | Apperson et al. | 250/343 |
| 5,335,060 | 8/1994 | Gentile et al. | 250/252.1 A |

FOREIGN PATENT DOCUMENTS 1369469  9/1988  U.S.S.R. ................. 250/252.1 A

OTHER PUBLICATIONS

Ukhanov et al., "Spectroradiometric Apparatus for Testing IR Receivers", Sov. J. Opt. Technol., 47(1), Jan. 1980, pp. 13–15.

Primary Examiner—Carolyn E. Fields
Attorney, Agent, or Firm—Gerald B. Hollins; Thomas L. Kundert

[57] ABSTRACT

An automated and preferably computer-controlled night vision device test arrangement for determination of spectral sensitivity in the infrared or other input spectrum regions. The test arrangement includes feedback control of night vision device input port signal levels, incremented selection of input signal wavelength, loop-residing spectrum increments and automated collection and presentation of test results.

18 Claims, 3 Drawing Sheets

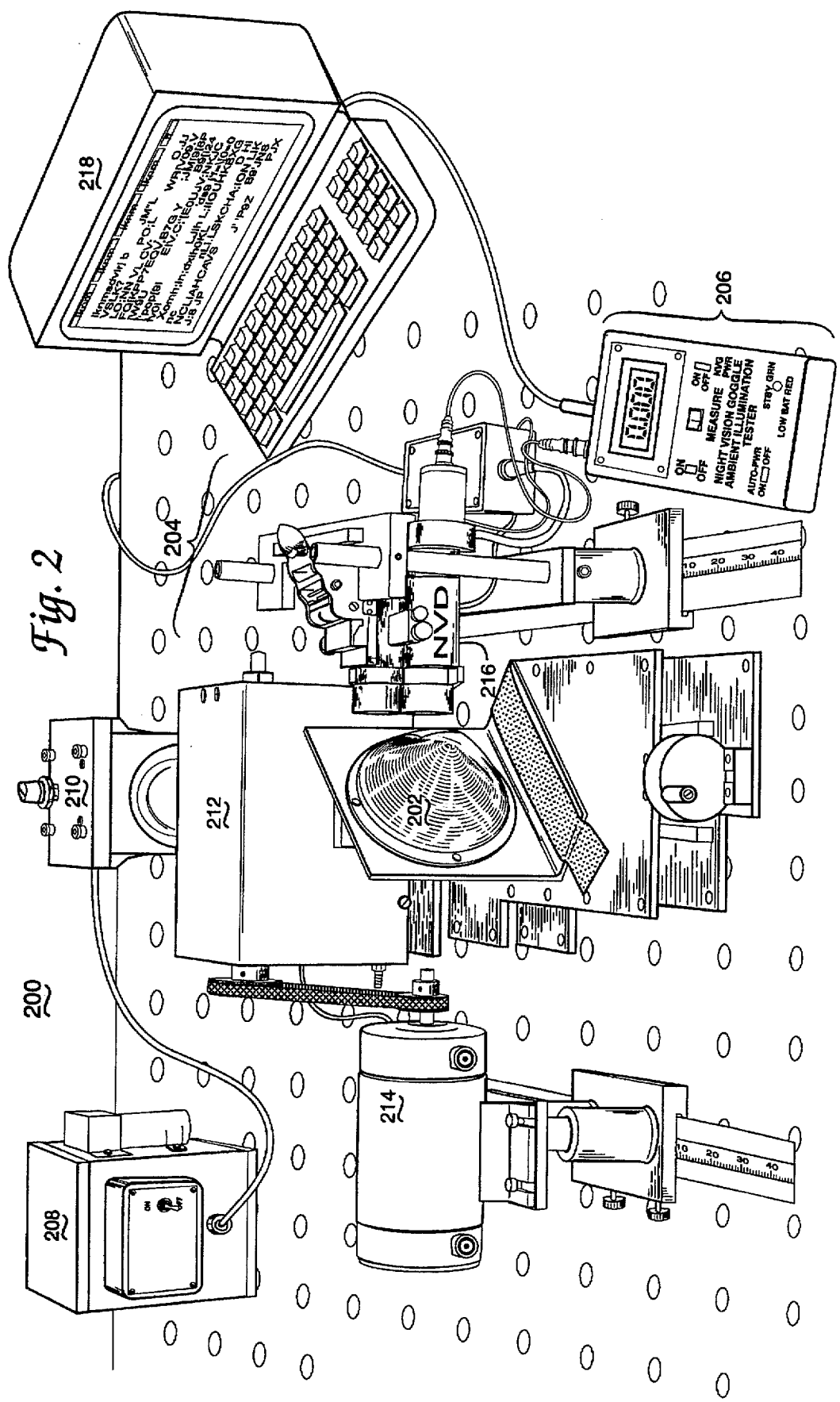

NIGHT VISION DEVICE AUTOMATED SPECTRAL RESPONSE DETERMINATION

RIGHTS OF THE GOVERNMENT

The invention described herein may be manufactured and used by or for the Government of the United States for all governmental purposes without the payment of any royalty.

BACKGROUND OF THE INVENTION

This invention concerns the field of automated measurement and testing as related to night vision devices.

A critical characteristic for any night vision device is its spectral sensitivity or its gain at different spectral input wavelengths, i.e. its gain in response to different "color" inputs. Formally of course the term "color" relates to wavelengths in the spectral range between 400 and 700 nanometers where the human eye is responsive. Since the present invention relates to night vision equipment having principal spectral response in the near-infrared region, the spectral range between 650 and 1000 nanometers of wavelength, the wavelength changes of present concern can be referred to as color changes only in a generic sense.

The concept of spectral response in fact largely dictates each specific night vision device employment. For example, there are Class A and Class B type night vision goggles (NVGs) which are filtered to have lower cutoff points at wavelengths of 625 and 665 nanometers, respectively. In order to use such goggles in an aircraft, the cockpit lighting must be restricted to wavelengths below the sensitivity of the goggles that are to be used in that cockpit. Since the cockpit lighting and NVG spectral characteristics thusly interact, the current military specification, MIL-L-85762, provides for such Class A 625 nanometer, minus blue filtered, and Class B 665 nanometer, minus blue filtered, night vision imaging systems for aircraft cockpit use. The spectral sensitivity or gain of the NVGs are thus a critical design characteristic due to an interaction with cockpit lighting. A similar characteristic is of concern with respect to the spectral transmissivity of the aircraft's windscreen and with respect to vehicular mounted and other radiant energy transmission components employed with ground-based night vision devices.

Currently, night vision device spectral sensitivity or gain measurements are made by manufacturers using custom optical test setups which are manually operated and which vary in implementation between manufacturers. Such measuring of a night vision device spectral sensitivity can be difficult and tedious, however, since the energy levels are very low and the spectral range covers infrared wavelengths of 300 nanometers through 1600 nanometers with a required 5 nanometer resolution. There is therefore perceived to be needed in this field a standardized and easily accomplished spectral sensitivity test arrangement which can be used by government and other buyers, a test arrangement which can also be adapted for use in the repair and maintenance environments. The present invention is believed to provide this capability.

The U.S. patent art indicates the presence of considerable inventive activity in the field of night vision devices and their testing. One such patent is U.S. Pat. No. 5,200,622 issued to J. M. Rouchon et al, a patent which is concerned with an infrared observation system having a self-checking feature. The Rouchon patent uses the Narcissus effect parasitic image which is imposed on the useful image of a pod mounted or other infrared system to achieve the self-checking feature. The Rouchon patent appears to be only distally related to the spectrum testing concept of the present invention, however.

The invention of R. D. Rosenthal in U.S. Pat. No. 5,204,532 is of general background interest with respect to the present invention in the sense that it discloses use of near-infrared spectral calibration standards, i.e. spectral clusters of known calibration constant, to achieve accurate calibration of a blood glucose measuring system.

Similarly the patent of J. R. Apperson et al., U.S. Pat. No. 5,206,511, is of general background interest with respect to the present invention. The Apperson patent discloses an arrangement for calibrating an infrared apparatus of the blood gas analyzer type, a device of the nature used in surgical operating rooms to measure a patient's breath gasses. This calibration is achieved with known standard elements which have predetermined numeric values of radiation reflection or absorption.

The invention of P. G. Morse in U.S. Pat. No. 4,965,448 is also of general background interest with respect to the present invention in the sense that it discloses use of a calibration standard in an infrared detector system. The invention of J. B. Sampsell et al. in U.S. Pat. No. 5,323,002 is also of interest with respect to the present invention, since it discloses use of a calibration arrangement in an optical system. In particular the Sampsell et al. system uses a spatial light modulator to achieve a desired mix of different temperature or different color-operated calibration sources. The Sampsell apparatus also discloses the use of a two or three point calibration arrangement, output to input calibration of an optical system and storage of a generated correction factor to correct the output to input calibration.

The prior patent of an inventor named in the present patent document, U.S. Pat. No. 5,070,239, issued to A. R. Pinkus, is also of interest with respect to the present invention. This patent discloses an NVG testing arrangement which includes an input signal source and an NVG output measuring apparatus for evaluating the tested NVG's response to this input signal. The latter part of this previous invention apparatus can in fact be used as part of the equipment for embodying the present invention, as is disclosed in greater detail subsequently herein. The contents of U.S. Pat. No. 5,070,239, are therefore hereby incorporated by reference herein.

SUMMARY OF THE INVENTION

The present invention accomplishes automated, computer controlled determination of input spectral response sensitivity for night vision devices.

It is an object of the present invention therefore, to provide an accurate and convenient night vision device spectral response determination arrangement.

It is another object of the invention to provide for low cost spectral response determinations in a night vision device.

It is another object of the invention to provide a spectral response determination which may be used in a variety of environments including the equipment evaluation, equipment testing or maintenance, and procurement-related environments.

It is another object of the invention to provide a spectral response determination arrangement which operates using a closed-loop computer-controlled operating principle.

It is another object of the invention to provide a spectral response determination which affords selectable spectral range and spectral resolution capabilities.

It is another object of the invention to provide a spectral response determination which affords a five nanometers nominal selectable wavelength range spectral resolution.

It is another object of the invention to provide a spectral response determination which may be used with a variety of night vision device configurations.

It is another object of the invention to provide a spectral response determination which may be used with a night vision goggle, a night vision periscope, a night vision telescope, a night vision gun sight, a night vision spotting scope, a night vision video camera, night vision binoculars, and helmet mounted night vision apparatus.

It is another object of the invention to provide a spectral response evaluation arrangement which may be used in both supplier and user environments to determine equipment capabilities.

It is another object of the invention to provide a spectral response evaluation apparatus which can be fabricated from ordinary and readily available components.

It is another object of the invention to provide a spectral response evaluation apparatus which is capable of detecting night vision device degradation resulting from extended field use.

Additional objects and features of the invention will be understood from the following description and claims and the accompanying drawings.

These and other objects of the invention are achieved by night vision device closed-loop computer controlled test apparatus for measuring an output amplitude versus input spectral frequency response characteristic in a night vision device, said apparatus comprising:

a monochromatic light source member having an electrical signal determinable narrow spectral band optical energy output that is disposed in illuminating relationship with an optical node member;

light intensity-determining digital computer controlled closed feedback loop means, inclusive of a digital computer member, a light node member-monitoring optical energy to electrical energy transducer member electrically connected with an input port of said computer, and an optical intensity regulating member optically disposed intermediate said monochromatic light source member and said optical node member and electrically connected with an output port of said computer, for computerized regulation of said monochromatic light source optical energy intensity at said optical node member;

means for measuring an optical energy output of said night vision device in response to intensity regulated monochromatic optical energy received by said device from said optical node member.

BRIEF DESCRIPTION OF THE DRAWINGS

FIG. 2 shows an overall view of apparatus which may be used to embody the present invention.

DETAILED DESCRIPTION

Figure 1:
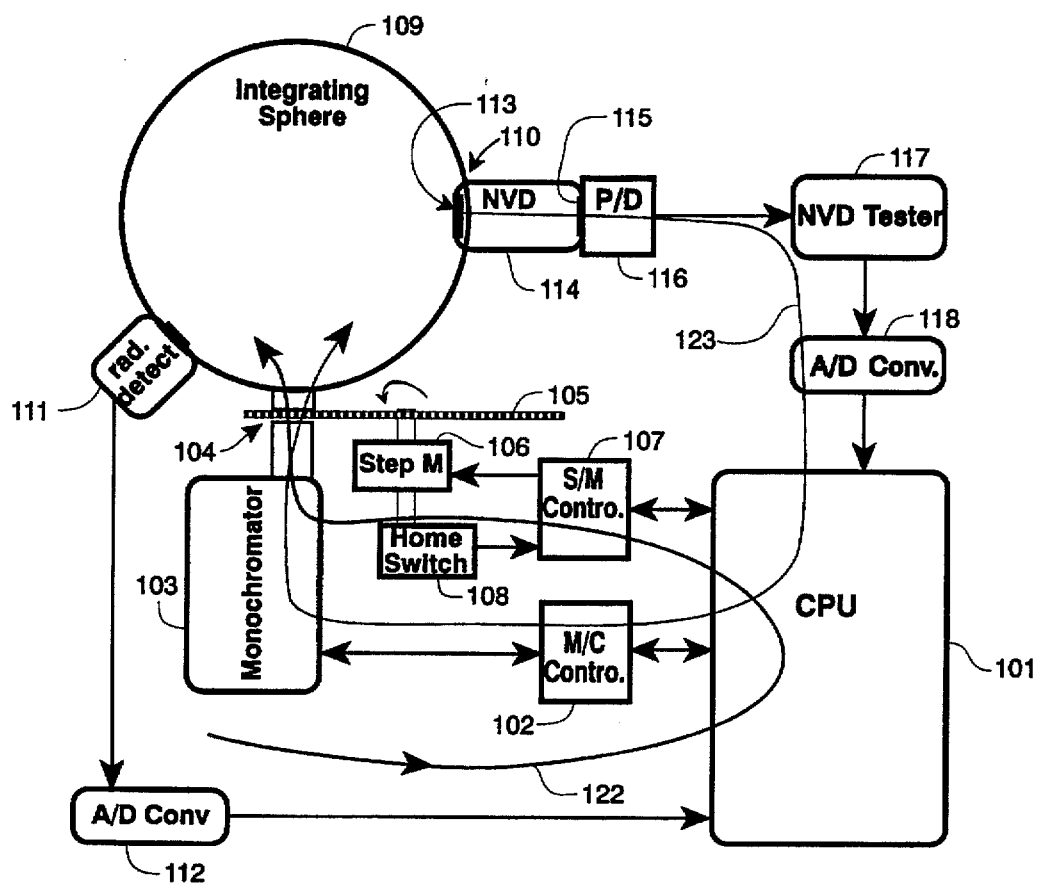
FIG. 1 shows a functional block diagram of apparatus which may be used to embody the present invention.

FIG. 2 in the drawings shows an overall perspective view of apparatus which may be used to embody the present invention. In FIG. 2 there is shown a night vision device 216 which is coupled to an illumination apparatus 200 and to night vision device readout apparatus 206. Also shown in FIG. 2 is a digital computer 218, which can be of the personal computer type, which is used in the preferred arrangement of the invention to accomplish control of the FIG. 2 components and accomplish measured output data or results processing. Illumination apparatus 200 includes several components which appear as separate entities in the drawing, these include the light source 210, the light source power supply 208, and the monochromatic apparatus 212 which is coupled optically to the light source 210.

FIG. 2 also shows a stepping motor element 214 which is used to rotate or mechanically position certain optical operative elements in the monochromatic apparatus 212 in order to change the wavelength of the light energy output from the monochromatic apparatus 212. Additionally shown in FIG. 2 is the spherical element 202 which is used (in its interior portion) to provide a diffuse and uniform optical input to night vision device 216 in the FIG. 2 apparatus. The night vision device under test in the FIG. 2 apparatus, the night vision device 216, is shown to be coupled to an output measurement system which is generally represented at 206. A system suitable for accomplishing the night vision device output measurement function at 206 is disclosed in the above incorporated by reference U.S. Pat. No. 5,070,329 which issued to one of the inventors named in the present document.

The optical components shown in FIG. 2 may be physically mounted on an optical bench, or any other reasonably stable mechanical platform. In a product-engineered embodiment of the invention these components may of course be disposed on some specially designed rigid structure. An array of wiring is of course used to convey power and signal flows among the components of the FIG. 2 apparatus, however in the interest of drawing simplicity and clarity, some of these conductors are omitted from the FIG. 2 view.

The computer 218 in the FIG. 2 drawing represents the preferred arrangement for integrating the FIG. 2 components into a unified and function-accomplishing system. As is disclosed in greater detail in connection with the functional block diagram of FIG. 1 and the software flow diagram of FIG. 3 below, this computer is preferably used to close two feedback loops which attend the FIG. 2 components and thereby both maintain a fixed level of illumination within the spherical member 202 of FIG. 2 and control the presentation of differing wavelength spectral energy to the night vision device 216 in FIG. 2. The computer 218 is also preferably used to accomplish the reading and temporary storing of output signal data relating to the night vision device 216. The computer 218 may be embodied as a personal computer of many possible varieties, a computer which is based on the currently popular Intel® 386 or 486 central processor chips is more than adequate for the present use, as is suggested in connection with FIG. 3 herein.

It is the intent of the invention therefore that the FIG. 2 components taken in combination provide a sequence of spectrally narrow-band, i.e., limited wavelength range, infrared energy signals of known intensity or known radiance level to the input port of the night vision device 216 under test. The FIG. 2 apparatus also provides storage of the output data or results from the night vision device under test and provides overall operational control of the testing system.

FIG. 1 in the drawings shows a functional block diagram for the testing system of the present invention. As represented in FIG. 1, a computer or CPU 101, which is the FIG. 1 embodiment of the FIG. 2 computer 218, controls the system settings and data collection. The computer 101, through a controller module 102, also commands the monochromator 103 to emit light having a specific, narrow-band spectral wavelength or frequency, at the port 104. As is believed to be well known in the art, this command has the effect of causing an optical element in the monochromator 103 to change in physical position in order to present a different spectral component of the polychromatic input energy to the monochromator device.

In practice this monochromator device movable optical element may consist of a rotatable optical prism or a movable diffraction grating, devices which cause broad spectrum input light to be disintegrated into physically dispersed individual spectral components, such as occurs in a rainbow for example. Movement of the this optical element causes a different one of these spectral components to be aligned with the monochromator's output port and thereby to exit the monochromator as its currently selected output. Apparatus of this type is available in the commercial marketplace from suppliers such as Ealing Electro Optics Incorporated of 89 Doug Brown Way, Holliston Mass., 01746; and Oriel Incorporated of 250 Long Beach Boulevard, Strafford, Conn., 06497. These suppliers can also provide the stepping motor controller circuitry used for driving a monochromator stepping motor, of the type shown at 214 for example, from a computer or from a manually controlled input in other non-computer embodiments of the invention.

The narrow-band energy from the monochromator 103 is controlled in intensity or modulated by a continuously variable, circular neutral density (ND) glass filter 105 in FIG. 1. The rotational position and therefore the realized density of the neutral density filter 105 is controlled by changing its angular or azimuth position, a change accomplished by another stepping motor 106. (The stepping motor 106 is not shown in the FIG. 2 drawing; and serves to change neutral density filter position.) The stepping motor 106 output shaft position is varied by the CPU 101 via a stepping motor controller 107. A switch 108 is used to signal the stepping motor controller 107 when the stepping motor shaft and the neutral density filter 105 are in the home position.

Monochromatic light, i.e., light originating in the source 210 in FIG. 2, then passes into an integrating sphere 109 in FIG. 1. This sphere, which is essentially a geometric sphere or a part thereof having a white, internal surface coating, serves to make the light diffuse and uniform at the sphere's exit aperture 110. A radiance detector 111 measures the radiance level or intensity of the light energy within the sphere 109. An analog-to-digital (A/D) converter 112 is used to interface the output of radiance detector 111 to the CPU 101. The CPU 101 uses the detected radiance information to adjust the neutral density filter 105 to the proper position, thereby maintaining the specified constant radiance output from the sphere 109. This adjustment may be considered to occur through the action of a computer inclusive closed feedback loop, a feedback loop which is shown at 122 in FIG. 1 and at 310 in FIG. 3 of the drawings.

The objective lens 113 of the night vision device 114 under test, is placed in an exit aperture of the sphere 109. The night vision device's output luminance, at its eyepiece 115, is sensed by a suitable light measuring device such as the photodetector subassembly 116 of the Night Vision Goggle Ambient Illumination Tester 117 of U.S. Pat. No. 5,070,239 or other appropriately configured light sensor. In the FIG. 2 drawing this photodetector subassembly 116 is shown to be provided with a numeric value display screen which may be viewed by a test operator. This numeric value is also coupled to the CPU 101 as is represented in FIG. 1. The analog output of the tester 117 is in fact fed to an A/D converter 118 so the CPU can record the tested night vision device's response as a digital number.

Figure 4:
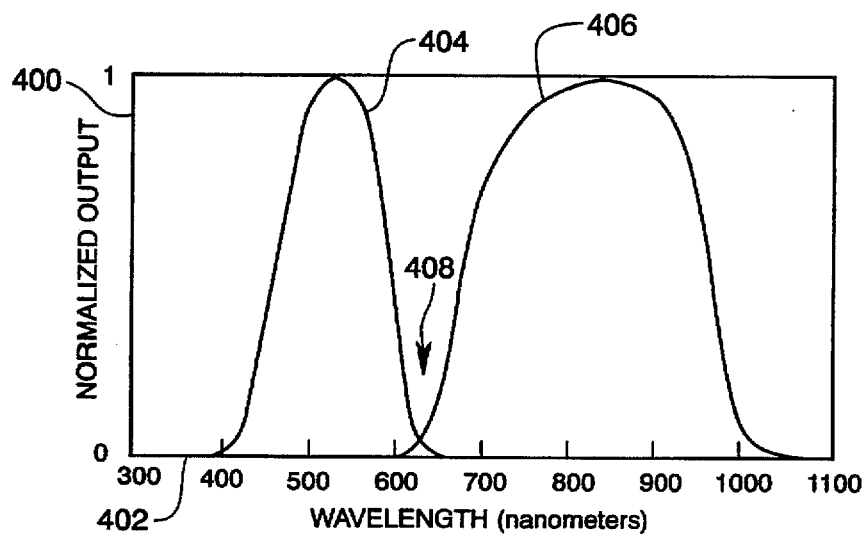
FIG. 4 shows an example of data which may be obtained with the present invention together with certain light source data which indicates the significance of present invention-obtained data in night vision device use.

Before a test, the monochromator is turned OFF while the night vision device 114 and the eyepiece photodetector subsystem 117 are each turned ON. Monochromator turn OFF is preferably achieved by output obscuration—in order to avoid subsequent monochromator turn-on instability and warm-up delays etc. Such obscuration can be achieved with an opaque area located at the home position of the circular variable neutral density filter 105. An initial reading is then taken of any background or electronic noise and is recorded as the zero point. A typical test sequence as follows then ensues. The monochromator 103 is first set to a specified wavelength (e.g., 300 nanometers). The neutral density filter 105 is then rotated until a preset level of radiance is obtained in the sphere 109, then the luminous output of the night vision device under test, 114, is measured and recorded. A preset wavelength step (of typically 5 nanometer step resolution) is used to increment the monochromator 103 to the next wavelength test value and the entire measurement sequence is repeated. A standard formatted (ASCII) or other data file can be created and saved for subsequent analysis by other computer programs including a spreadsheet routine. FIG. 4 in the drawings shows at 406 an example of the final test results where the night vision device's spectral sensitivity or gain is plotted as a function of wavelength using such a data file.

COMPUTER SOFTWARE

Figure 3:
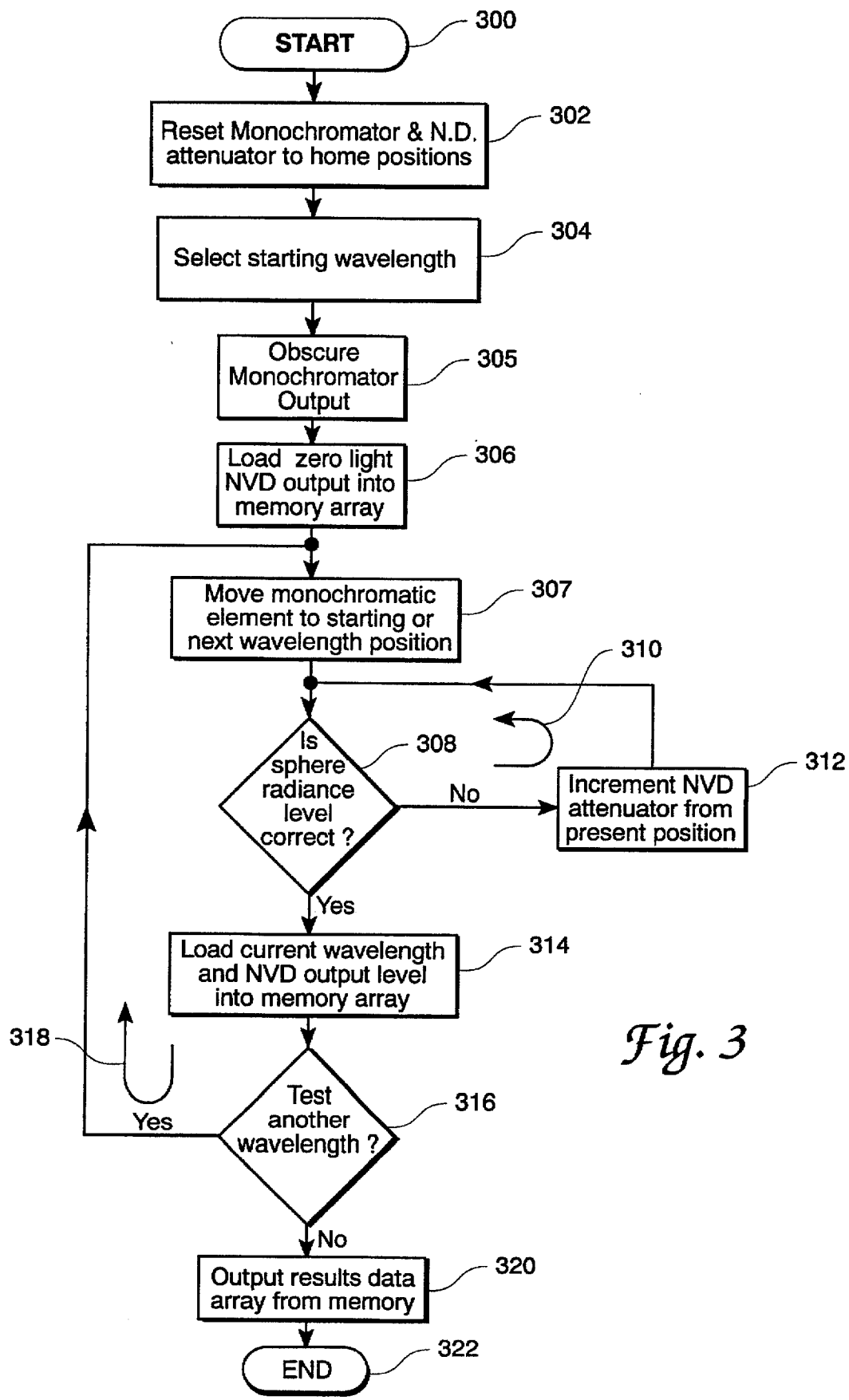
FIG. 3 shows a flow diagram for computer software or a logic controller which may be used to embody the present invention.

FIG. 3 in the drawings shows a flow sequence, in block diagram form, for the software which may be used in the computer 218 of FIG. 2 i.e., in the CPU 101 of FIG. 1, to accomplish this typical test sequence. Such software may also be used to accomplish special test sequences if needed, to perform output results recording, and also to control the overall test sequence. The information disclosed in this FIG. 3 drawing appears in the form of conventional computer flow diagram block symbols (wherein program flow decisions are represented by diamond-shaped boxes and so on) and with function-related text inclusions appearing in each block.

In the FIG. 3 flow diagram, following the start and reset functions of blocks 300, 302, and 304, the night vision device input port is darkened and a background level output reading recorded, as is indicated in blocks 305 and 306 and as is described above herein. After selection of the user's designated starting wavelength in block 307, the closed feedback loop adjustment of input radiance level for the night vision device is made in the FIG. 3 blocks 308 and 312 with the closed feedback loop being indicated at 310. Results recording in the computer's or other memory is accomplished in block 314 of FIG. 3 and the decision regarding testing at different wavelengths made at block 316. Wavelength increments of five nanometers are preferred and are selected in the computer prior to the FIG. 3 sequence. When the final selected wavelength has been tested, the block 316 decision provides entry into the results data output routine indicated in block 320 and the test sequence is ended. The loop indicated at 318 in the FIG. 3 drawing provides for repetition of the block 307 through block 316 step sequence for each wavelength value in the selected test range for the night vision device. A general representation of this loop 318 in relation to the testing system's other components also appears at 123 in FIG. 1 of the drawings.

The FIG. 3 flow diagram therefore represents one possible sequence, i.e., a preferred arrangement, of steps for performing the control and data storage functions of the present invention. Other step sequences are of course possible within the spirit of the invention and will occur to persons of skill in the computer and electrical arts. The steps represented in the FIG. 3 flow diagram are moreover largely determined by functions required during operation of the invention and are essentially recited without regard for refinements such as software capability-imposed conveniences or limitations for example.

The computer software code used with the present invention, the software resident in the CPU 101 or the computer 218, is not complex in nature by present-day standards; such software may in fact be embodied without a significant degree of experimentation (conceivably in the form of one page of code or less) in most of the known software languages by persons of ordinary or even beginning skill in the software art. The exact nature of such software will of course depend on the rules of the language selected, however significant portions are known in the computer art and are readily available as end-use items or for use as models in preparing custom tailored software.

In this latter regard the data storage and presentation functions of the FIG. 3 sequence may be accomplished by communicating the FIG. 3 block 314 data into an Excel® type spreadsheet file for storage and subsequent presentation. The monochromator control software for another example may be arranged in the manner of off-the-shelf monochromator related software which is available from the monochromator manufacturer.

In reality however, the herein recited computer and software-inclusive embodiment of the invention is actually a matter of convenience and practicality and may be replaced by dedicated hardware or some combination of dedicated hardware and elementary computer software or by programmed logic arrays or alternately by other arrangements as are known in the electrical art.

FIG. 4 in the drawings shows two aspects of the present invention; one of these aspects concerns the data curve 406 which is typical of the night vision device response to be identified with use of the present invention. The curve 406, which is plotted against the normalized output amplitude vs. wavelength axis pair 400 and 402, is representative of characteristics to be expected for a correctly functioning Class A (625 nanometer lower cutoff wavelength), Generation III, night vision device. The FIG. 4 illustrated separation between the night vision device response curve 406 and the output curve 404 of an electroluminescent lamp represents the condition needed in the cockpit of a night vision device-equipped aircraft in order to avoid cockpit ambient light interference with the night vision device's operation.

A second aspect of the FIG. 4 curve family therefore relates to this separation between curves 404 and 406 and concerns the importance of maintaining this separation in an integral and non-shifted condition during field use of night vision device equipment. Clearly if either of these curves is shifted toward the other by, for example, extended use of the night vision device over long periods, or if the amplitude response of the night vision device becomes seriously degraded by such use, then the curve intersection at 408 implies that interference between cockpit lighting and night vision equipment is to be expected. (Serious attenuation of the curve 406 peak for example, has the effect of a spatial frequency response shift if the system incorporates automatic gain control or other output maintenance arrangements.) The detection and prevention of such occurrences is of course one of the possible uses of the present invention.

The present invention therefore offers speed, accuracy, and automation enhancements in a night vision device-dedicated test apparatus as compared to the brass board and optical bench techniques that have been used previously. Since the invention provides an interactive detector, variable neutral density filter, and monochromator settings controlled automatically by a computer, night vision devices can be quickly assessed at multiple different input levels with use of the invention. The invention also provides a comprehensive evaluation of night vision equipment that is suitable for both manufacturing and user employment. The disclosed equipment is also suitable for use as a standardized measurement tool and yet is sufficiently low in cost and easy to operate as to enable use as a maintenance tool. The disclosed equipment can also be adapted to test larger night vision devices such as the night vision periscopes used in battle tanks.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Night vision device closed-loop computer member controlled test apparatus for measuring an output amplitude versus input spectral frequency response characteristic in a night vision device, said apparatus comprising:

a monochromatic light source member having an electrical signal determinable narrow spectral band optical energy output that is disposed in illuminating relationship with an optical node member;

light intensity-determining digital computer member controlled closed feedback loop means, inclusive of a digital computer member, a light node member-monitoring optical energy to electrical energy transducer member electrically connected with an input port of said computer member, and an optical intensity regulating member optically disposed intermediate said monochromatic light source member and said optical node member and electrically connected with an output port of said computer member, for computerized closed loop regulation of said monochromatic light source optical energy intensity at said optical node member;

means for measuring an optical energy output of said night vision device in response to intensity regulated monochromatic optical energy received by said device from said optical node member.

2. The apparatus of claim 1 wherein said optical node member comprises an integrating interior surface portion of a spherical optical integrating member.

3. The apparatus of claim 2 wherein said integrating interior surface portion of said spherical optical integrating member includes a diffusing white surface coating.

4. The apparatus of claim 1 wherein said intensity regulating member comprises an electrically controlled neutral density filter.

5. The apparatus of claim 1 wherein said digital computer member further includes means for sampling signals received at said computer member input port and means connected with said computer member output port for generating a control signal used in said intensity regulating member.

6. The apparatus of claim 1 wherein said monochromatic light source member comprises a monochromator inclusive of one of the elements of a physically movable optical prism or a physically movable diffraction grating.

7. A closed-loop, computer controlled, method for determining spectral response sensitivity of a night vision apparatus, said method comprising the steps of:

establishing a digital computer controlled, light energy intensity-determining, first closed feedback loop, said first feedback loop being inclusive of a monochromatic light source of selectable output wavelength, a computer-controlled light energy attenuator, and a computer input signal generating light energy transducer element having photon energization by samples from said light source;

generating at a light node, and by way of controlling said light energy attenuator with said first closed feedback loop, a selected level of light intensity of selected wavelength range originating in said monochromatic light source;

coupling light energy from said light node into an input port of said night vision apparatus; and measuring a generated light energy output of said night vision apparatus in response to each of a sequence of wavelength selected, second feedback loop-determined, monochromatic light energy input signals from said light node;

said measuring step including selecting a first and subsequent spectral operating wavelength of said monochromatic light source via an output port of said digital computer and recording a light energy output level of said night vision apparatus via a light energy to electrical energy transducer element coupled therewith and coupled to an input port of said digital computer.

8. The method of claim 7 wherein said sequence of wavelength-selected, second feedback loop-determined, monochromatic light energy input signals from said light node are light signals within the spectral wavelength range of three hundred to sixteen hundred nanometers.

9. The method of claim 7 wherein said sequence of selected, second feedback loop-determined, monochromatic light energy input signals from said light node are light signals of differing spectral wavelength and said wavelengths are separated by a five nanometers nominal selectable wavelength range.

10. The method of claim 7 wherein said sequence of wavelength-selected, second feedback loop-determined, monochromatic light energy input signals from said light node are light signals of computer selected light wavelength and wherein each new wavelength selection is made in said computer in response to receipt of a previous light energy output level of said night vision apparatus via said light energy to electrical energy transducer element coupled therewith and coupled to said input port of said digital computer.

11. The method of claim 7 wherein said recording of a light energy output level of said night vision apparatus is also accomplished in a portion of said computer.

12. An automated method of determining spectral response-limited output sensitivity characteristics for a night vision apparatus comprising the steps of:

energizing an optical input port of said night vision apparatus with infrared energy of selected spectral content and radiance level;

measuring and recording an eyepiece port-presented, visible spectrum, output signal from said night vision apparatus in response to said selected spectra-content input-port infrared energy;

employing a digital computer for selecting and controlling said energizing step spectral content and radiance level, controlling said measuring step, and performing said recording step; and repeating said digital computer-employing energizing, measuring, and recording steps for a plurality of differing infrared spectral wavelengths.

13. The method of claim 12 wherein said energizing step selected radiance level is controlled by said computer in response to closed-loop output port feedback signals generated by said computer in response to radiance level sample signals received at a computer input port.

14. The method of claim 12 wherein said energizing step includes energizing a movable prism-inclusive or a movable diffraction grating-inclusive monochromator apparatus with infrared energy.

15. The method of claim 14 wherein said energizing step further includes moving one of said movable prism and movable diffraction grating in said monochromator apparatus in selection of a different spectral wavelength input for said night vision apparatus and in response to a control signal received from said digital computer.

16. The method of claim 12 wherein said energizing step further includes presenting a diffuse and uniform infrared energy input at said night vision apparatus input port.

17. The method of claim 16 wherein said diffuse and uniform infrared energy input originates in a radiant energy-integrating spherical member receiving infrared energy output from said monochromator apparatus.

18. The method of claim 17 wherein said energizing step further includes controlling said radiance level within said spherical member at a selected level using a loop-closing feedback signal issuing from said digital computer in response to a radiance electrical sampling signal input received from said spherical member.

* * * * *